455-614 AU 263 EX
2/3/87 XR 4,641,377

United States Patent [19]

Rush et al.

[11] Patent Number: 4,641,377

[45] Date of Patent: Feb. 3, 1987

[54] PHOTOACOUSTIC SPEAKER AND METHOD

[75] Inventors: William F. Rush, Tinley Park; James E. Huebler, Brookfield; Peter Lysenko, Calumet City, all of Ill.

[73] Assignee: Institute of Gas Technology, Chicago, Ill.

[21] Appl. No.: 597,705

[22] Filed: Apr. 6, 1984

[51] Int. Cl.⁴ ............ H04B 9/00

[52] U.S. Cl. ............ 381/111; 455/619; 455/614; 381/164

[58] Field of Search ............ 455/614, 609; 179/113; 455/619

[56] References Cited

U.S. PATENT DOCUMENTS

| | | | |
|---|---|---|---|
| 241,909 | 5/1881 | Bell et al. | 455/614 |
| 4,002,897 | 1/1977 | Kleinmen et al. | 455/619 |
| 4,163,382 | 8/1979 | Amer | 73/24 |

FOREIGN PATENT DOCUMENTS

| | | | |
|---|---|---|---|
| 2639822 | 9/1976 | Fed. Rep. of Germany | 455/619 |

*Primary Examiner*—Joseph A. Orsino, Jr.
*Attorney, Agent, or Firm*—Thomas W. Speckman

[57] ABSTRACT

A photoacoustic speaker and method for producing photoacoustic sound by utilizing a laser beam, modulating the intensity of the laser beam in response to audio signal inputs and passing the modulated laser beam into a gas absorption chamber wherein gas capable of absorption of the modulated laser beam upon such absorption produces photothermic pressure waves corresponding to the audio signal inputs and which produce sound upon impingement on walls of the absorption chamber. The photoacoustic speaker achieves high fidelity sound reproduction and is capable of projecting a column of sound thereby providing an acoustic dimension effect.

21 Claims, 3 Drawing Figures

PHOTOACOUSTIC SPEAKER AND METHOD

BACKGROUND OF THE INVENTION

This invention relates to a photoacoustic speaker which utilizes a laser beam with means for altering its intensity to provide the desired audio signal. The intensity modulated laser beam enters an absorption chamber which generates sound as a result of the photoacoustic effect in gases. This photoacoustic speaker device achieves high fidelity sound reproduction and can also project a column of sound, providing an acoustic dimension effect.

DESCRIPTION OF THE PRIOR ART

Conventional speaker systems employ an electromechanical speaker or a collection of electromechanical speakers to reproduce and project sound. Sound quality may be enhanced by assembling an array of electromechanical speakers which contains the broad range of components necessary to faithfully reproduce sounds of divergent frequencies. Mechanical difficulties in electromechanical speaker design introduce distortion, and the mechanical conversion of electrical impulses to sound is inefficient. Low frequency sound is especially susceptible to distortion in these conventional speakers.

A speaker is known wherein electrical fields induce the movement of ionized gas in response to audio amplifier signals. This device reduces the distortion inherent in electromechanical speaker systems, but it cannot produce an acoustic dimension effect by projecting a column of sound.

The photoacoustic effect in gases, the absorption of photo-energy by gas causing heating and cooling to result in an acoustic response, is well known to the art. A device known as the spectrophone has been used since the late 1930's. It applies the principles of the photoacoustic effect in gases to detect the presence of specific gases or to analyze the composition of a mixture of gases. High powered lasers have been used to produce sound in scientific laboratories in the analysis of gas mixtures.

Application of the photoacoustic effect in gases to achieve high fidelity sound reproduction and to produce a column of sound which provides an acoustic dimension effect is not disclosed by prior art known to the inventors. Further, the use of thin membranes in combination with the photoacoustic effect to produce sound outside the membrane is believed to be novel.

SUMMARY OF THE INVENTION

This invention relates to a photoacoustic speaker which applies the principles of the photoacoustic effect in gases to achieve high fidelity sound reproduction. A single device, operating in accordance with this invention, efficiently generates distortion free sound and can also project a column of sound which provides an acoustic dimension effect.

The photoacoustic speaker in one embodiment of this invention comprises a continuously operating laser source, a means for modulating the intensity of the laser beam in response to signal inputs, and a gas absorption chamber. Any laser source known to the art is suitable for use in this invention. The laser power output may be controlled by signal inputs from an audio amplifier of any standard design. The audio amplifier varies its power output in response to the audio signal inputs and is impedance matched to a laser beam modulating means. The laser beam modulating means may be a laser cavity length transducer which is contained in the laser source and modifies the laser cavity length in response to signals received from the audio amplifier, thereby modulating the laser beam intensity. Any other means of modulating the laser beam which is sufficiently fast to achieve audio frequencies may be used. Alternatively, a continuously operating laser source may be used which produces and emits a constant intensity laser beam which is altered as it passes through an electrooptical laser beam modulator. In this embodiment, the audio amplifier is impedance matched to the electrooptical beam modulator, and the optical transmission of the beam modulator varies in proportion to the applied voltage delivered by the audio amplifier. The intensity of the laser beam is thus modulated in response to the audio amplifier voltage output, and the resultant beam intensity is proportional to the desired audio signal. Any other suitable method for modulating the laser beam may be used, such as mechanical choppers.

The modulated laser beam enters a gas absorption chamber containing gases which readily absorb the radiation emitted in the laser beam. The absorption chamber may be a large contained area such as a room, or it may be a relatively small, sealed containment chamber. A small, sealed containment chamber may embody means for transmitting the sound produced to outside the chamber. Any gas capable of absorption of laser light energy may be used; the selection may be made by one skilled in the art based upon absorption properties of gases. The absorbing gas may be air or it may be a gas or mixture of gases specially selected for their absorbing qualities. The gas is heated as it absorbs photons of the laser output wavelength. Because the intensity of the laser beam varies according to the audio amplifier voltage output, heating of the gas is not uniform, but varies with the intensity of the beam. The absorbing gas is thus heated proportionately according to the desired audio signal. The heating and subsequent cooling of the absorbing gases produces pressure waves which propagate radially outwardly. A column or a point source of sound can be produced by this photoacoustic effect. The pressure waves impinge on the walls of the absorption chamber to produce sound. If the walls of the absorption chamber are sufficiently thin and flexible, the sound is transmitted outside the chamber. A column of sound which provides a dimensional acoustic effect is produced when the laser beam is absorbed over a long beam path length. This can be accomplished if the concentration of the absorbing gas is reduced and the walls of the absorption chamber comprise a thin, elongated flexible membrane. Any elastic membrane material of low density and high elasticity may be used, such as latex and other natural and synthetic membranes.

In one embodiment, the modulated laser beam is directed through a laser transparent window into a sealed absorption chamber. Suitable laser transparent windows may be materials which allow passage of laser beams of the frequency being used; zinc selenide being suitable in the infrared and glass being suitable in the visible light regions of the spectrum. The sealed absorption chamber is enclosed by a laser transparent window on one end, a laser beam reflector at the opposite end, and has a flexible material forming the sides and gastightly joined to the ends. Any laser reflective material may be used as the laser beam reflector, such as, copper, aluminum, or gold.

In another embodiment, the photoacoustic speaker device incorporates a laser beam expander or contractor of any conventional design to expand or contract the diameter of the constant intensity or intensity modulated laser beam. By expanding or contracting the diameter of the modulated laser beam, the beam is adjusted to conform to the cross-sectional area of energy absorption in the gas absorption chamber, and efficient conversion of the laser radiation to sound is achieved.

Accordingly, it is one object of this invention to provide a photoacoustic speaker which utilizes the photoacoustic effect in gases to achieve high fidelity sound reproduction.

It is another object of this invention to provide a photoacoustic speaker which projects a point source of sound.

It is still another object of this invention to provide a photoacoustic speaker which projects a column of sound having an acoustic dimension effect.

It is yet another object of this invention to efficiently convert photothermic radiation to sound.

BRIEF DESCRIPTION OF THE DRAWINGS

These and other objects, advantages and features of this invention will be apparent from the description together with the drawings wherein.

DESCRIPTION OF THE PREFERRED EMBODIMENTS

Figure 1:
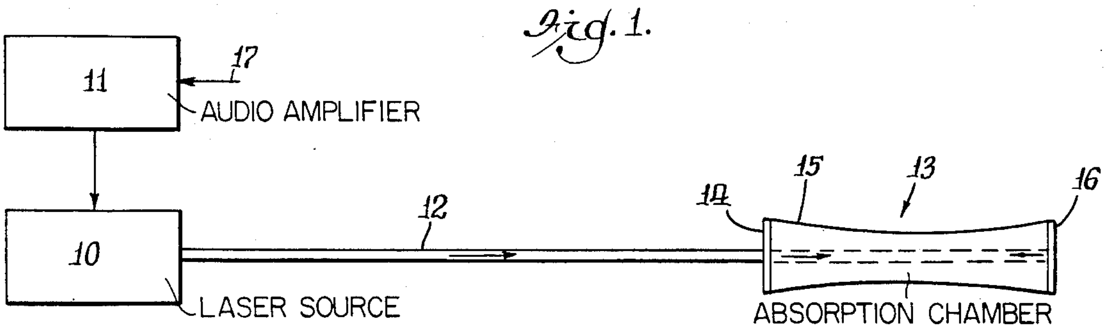
FIG. 1 is a schematic representation of a photoacoustic speaker according to this invention.

In the embodiment illustrated in FIG. 1, varying audio signal inputs 17 are delivered to audio amplifier 11. Audio amplifier 11 may be of any known design, which varies its power output in response to audio signal inputs 17. Variable power output from audio amplifier 11 is transmitted to continuously operating laser source 10. Continuously operating laser source 10 may be any stable laser source known to the art, and, in this embodiment, is associated with a laser beam modulating means comprising a laser cavity length transducer. The intensity of the laser beam is varied according to the length of the laser cavity, which length is directly regulated by the laser cavity length modulator in response to the audio amplifier output. Suitable laser cavity length modulators include, but are not limited to, a laser containing a grating and piezoelectric transducer to control cavity length in proportion to the audio amplifier output. Solid state lasers or light emitting diodes are also acceptable methods of illuminating the photoacoustic chamber.

Intensity modulated laser beam 12 is emitted from laser source 10 and enters a gas absorption chamber confining gases which readily absorb the laser radiation. The gas absorption chamber may be any confined volume, including a room of any shape or dimension, and the absorbing gas may be air. The absorption chamber is preferably elongated and of cross-sectional shape and dimension to closely match the cross-section of the laser beam. However, the laser beam should not strike the chamber side walls. The absorption chamber length is preferably about half to about three-quarters the distance required for the laser energy to be substantially absorbed by the gas. As shown in FIG. 1, gas absorption chamber 13 is a sealed contained volume. Intensity modulated laser beam 12 enters gas absorption chamber 13 through laser transparent window 14. Gas absorption chamber 13 is sealed to enclose absorbing gas which may comprise air, or a gas or mixture of gases specially selected for absorbing qualities. Any gas which absorbs laser radiation is acceptable with nontoxic gases being preferred. Optical absorption properties are suitable criteria to identify suitable gases to match the laser beam used. The concentration of the absorbing gas may be adjusted so that preferably about one-half to about three-quarters of the radiation entering the chamber is absorbed as the laser radiation traverses the length of the chamber. The concentration of the absorbing gas may be varied, however, to produce special effects. As the gas absorbs photons of the laser output wavelength it is heated in proportion to the intensity of the laser beam which, in turn, was modulated in accordance with the audio signal input to produce the desired sound.

The heating and subsequent cooling of the absorbing gas causes expansion and contraction of the absorbing gas thereby generating pressure waves which propagate radially outward. The frequency of these pressure waves is directly proportional to the intensity of the modulated laser beam. These pressure waves impinge on membrane 15 which forms the wall of gas absorption chamber 13. Membrane 15 is constructed of a flexible material which, according to this embodiment, forms a generally cylindrical shape and is gastightly joined to transparent window 14 at one end and laser beam reflector 16 at the opposite end. Laser beam reflector 16 reflects laser radiation so that it will have another opportunity to be absorbed by the gas and thereby generate additional sound. The reflected beam will thereby promote more constant energy absorption along the length of gas absorption chamber 13. Membrane 15 is thin and flexible so that it can expand and contract with the pressure waves to generate sound. Suitable materials include, but are not limited to, flexible, thin gauge metals such as aluminum and elastic latex rubber material. An aluminum membrane generates high quality sound inside the chamber but does not permit sound transmission outside the chamber. A thin elastic latex membrane permits high fidelity sound transmission outside the chamber.

Gas absorption chamber 13 is preferably generally cylindrical in shape with the length more than five times greater, preferably about 10 to about 20 times greater, than the diameter. Although large volume chambers are suitable for use according to this invention, the diameter of the chamber is preferably small, in the order of 1–3 cm, so that a relatively small volume cylinder is formed as gas absorption chamber 13. The absorbing gas in the chamber may be maintained at a slightly positive or a slightly negative pressure. In FIG. 1, the absorbing gas contained in gas absorption chamber 13 is at a slightly negative pressure, preferably about 0.6 to about 1.0 atmosphere, which causes a slight inward deformation of membrane 15 which forms the wall of gas absorption chamber 13.

Figure 2:
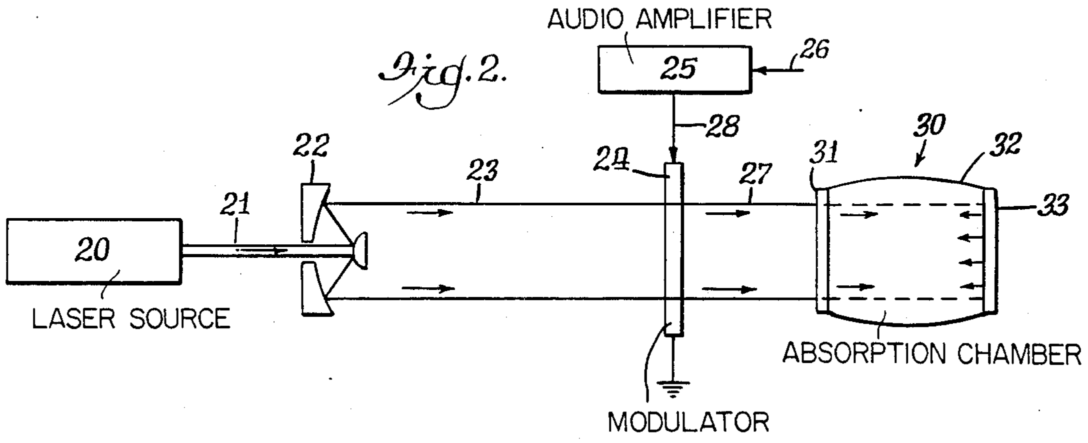
FIG. 2 is a schematic representation of an alternative embodiment of a photoacoustic speaker including a laser beam expander.

FIG. 2 illustrates another embodiment of a photoacoustic speaker of this invention. Laser source 20 continuously emits a laser beam of constant intensity. Constant intensity narrow laser beam 21 is directed to expander 22 of any conventional design. Expander 22 increases the diameter of narrow laser beam 21 which ultimately enters gas absorption chamber 30. The diameter of the laser beam is preferably adjusted so that it corresponds to the diameter of the gas absorption chamber, so that high gas radiation is achieved, resulting in high conversion efficiency and high fidelity sound reproduction.

Figure 3:
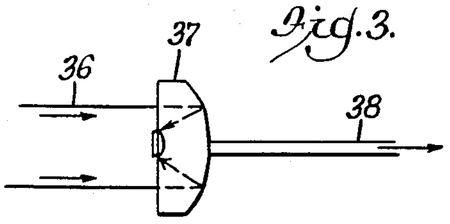
FIG. 3 is a schematic representation of a laser beam contractor suitable for use according to this invention.

Similarly, contractor 37, as shown in FIG. 3, may be incorporated in the photoacoustic speaker. In this embodiment, laser beam 36 passes through contractor 37 and contracted laser beam 38 is directed, ultimately, to the gas absorption chamber. By using laser contractors and expanders to adjust the diameter of the laser beam, a wide variety of gas absorption chamber diameters can be accommodated to efficiently radiate the absorbing gases to generate sound. Expanders and contractors may be used with a constant intensity laser beam, or an intensity modulated laser beam. Suitable expanders and contractors for laser beams are known to the art and may be used in the manner described.

As illustrated in FIG. 2, expanded laser beam 23 is directed to a means for modulating its intensity comprising electrooptical laser beam modulator 24 which receives variable voltage output 28 from audio amplifier 25 in response to varying audio signal inputs 26. Electrooptical laser beam modulator 24 modulates the optical transmission in proportion to the applied voltage 28 delivered by audio amplifier 25 which is impedance matched to electrooptical laser beam modulator 24. Suitable laser beam modulators responsive to varying electrical signal inputs are known to the art and may be applied here as described above. Modulated laser beam 27 enters gas absorption chamber 30 through laser transparent window 31. Gas absorption chamber 30 comprises laser transparent window 31 and laser reflector 33 gastightly sealed to flexible membrane 32, to form, preferably, a generally cylindrical chamber. Gas absorption chamber 30 functions similarly to and is susceptible to the preferred forms described above for gas absorption chamber 13. The absorbing gases confined in gas absorption chamber 30 are maintained at a slightly positive pressure, preferably about 1.0 to about 1.4 atmosphere, which causes the outward deformation of membrane 32 shown in FIG. 2.

One unique feature of the photoacoustic speaker device of this invention is its ability to project a column of sound which provides an acoustic dimension effect. The generate a column of sound, the concentration of absorbing gas in the gas absorption chamber may be reduced to promote uniform absorption along the length of the chamber which results in the propagation of elongated cylindrical pressure waves to generate a column of sound. The length of the chamber may also be increased to provide a longer column. Conversely, a higher concentration of absorbing gases and a shorter gas absorption chamber will promote the generation of a point source of sound because virtually all of the laser radiation will be absorbed within a very short distance after entry into the gas absorption chamber, and pressure waves will propagate from that point rather than along the length of the chamber.

Suitable individual electronic components used in this invention, such as the audio amplifier, laser source, laser beam expanders and contractors, and laser beam modulators are known to the art and will be apparent upon reading this disclosure. Any means for achieving the above described laser beam properties are suitable for use in this invention.

The method for producing photoacoustic sound according to this invention involves producing a laser beam; modulating the intensity of the laser beam in proportion to audio signal inputs; and passing the modulated laser beam into a gas absorption chamber confining gas capable of absorption of the modulated laser beam, thereby producing photothermic pressure waves which produce sound upon inpingement on walls of the absorption chamber. The method for producing photoacoustic sound may be modified as described above with respect to the various embodiments of photoacoustic speakers according to this invention.

The following examples set forth specific embodiments in detail and are meant to exemplify the invention and not to limit it in any way.

EXAMPLE I

In one preferred embodiment, a photoacoustic speaker, as schematically shown in FIG. 1, was built with a laser source which emits a carbon dioxide laser beam having a diameter of about 1 mm, a wavelength of about 10.6 microns, and a beam intensity of about 1 watt/cm$^2$. The laser source has an enclosed grating to measure wavelength and a piezoelectric transducer to regulate the cavity length. The cavity length is varied according to the output received from an audio amplifier which in turn is proportional to the audio signal inputs it receives.

The intensity modulated laser beam enters one end of a gas absorption chamber through a laser transparent zinc selenide window. Sulfur hexafluoride is the absorbing gas and is present in the chamber at a concentration of about 150 ppm in nitrogen. The gas absorption chamber is about 10 cm long, and has a diameter of about 1 cm. The generally cylindrical wall of the gas absorption chamber is a permeable elastic flexible latex membrane which allows the chamber wall to flex and transmit sound yet retain the absorbing gas at a pressure of about 0.8 atmosphere. The end wall of the gas absorption chamber opposite the laser transparent window has a reflective coating of gold on its surface facing the interior of the gas absorption chamber. Upon absorption of laser energy by the absorption gas, elongated cylindrical pressure waves were generated which expand outwardly from the gas absorption chamber at a pressure amplitude of about $10^{-6}$ atm. The frequency of these waves is directly proportional to intensity of the modulated laser beam. The waves generate audible sound corresponding to the audio input singals. The photoacoustic speaker accomplishes, in a single unit, high fidelity sound reproduction and efficient photoacoustic conversion, and can project a column of sound providing an acoustic dimension effect.

EXAMPLE II

A cylindrical latex membrane closed at one end was inflated to 2 cm diameter and 15 cm long and a pressure of 1.1 atmosphere with a mixture of 10 percent sulfur hexafluoride and 90 percent nitrogen, by volume. A laser transparent zinc selenide window was sealed to the open end and illuminated with a 1 watt carbon dioxide laser beam having a 3 mm diameter. Modulation of the laser beam was achieved with a mechanical beam chopper over a frequency range of 10 hz to 990 hz. Sound levels were measured with an A-weighted sound pressure level meter and found to be 72.5 dB at 990 hz and 61.5 dB at 100 hz.

While in the foregoing specification this invention has been described in relation to certain preferred embodiments thereof and many details have been set forth for purpose of illustration, it will be apparent to those skilled in the art that the invention is susceptible to additional embodiments and that certain of the details described herein can be varied considerably without departing from the basic principles of the invention.

We claim:

1. A photoacoustic speaker comprising a laser beam source means, a modulating means capable of modulating the intensity of said laser beam in response to audio signal inputs producing a corresponding modulated laser beam, and an elongated sealed gas absorption chamber having a laser transparent window in one end in the path of said laser beam, a rigid end opposite to said window, said gas absorption chamber having elongated thin flexible side walls, said two ends and said flexible side walls confining gas capable of absorption of said modulated laser beam thereby producing pressure waves which impinge on said elongated flexible side walls of said chamber to produce sound and transmit said sound exterior to said chamber.

2. A photoacoustic speaker according to claim 1 wherein said laser beam modulating means is a laser cavity length transducer.

3. A photoacoustic speaker according to claim 1 wherein said laser beam modulating means is an electro-optical beam modulator.

4. A photoacoustic speaker according to claim 1 wherein said laser beam modulating means is a mechanical beam chopper.

5. A photoacoustic speaker according to claim 1 wherein said laser beam passes through a beam expander before entering said gas absorption chamber, said beam expander capable of sizing the expanded beam to said absorption chamber.

6. A photoacoustic speaker according to claim 5 wherein said laser beam passes through said beam expander prior to said modulating means.

7. A photoacoustic speaker according to claim 1 wherein said laser beam passes through a beam contractor before entering said gas absorption chamber, said beam contractor capable of sizing the contracted beam to said absorption chamber.

8. A photoacoustic speaker according to claim 7 wherein said laser beam passes through said beam contractor prior to said modulating means.

9. A photoacoustic speaker according to claim 1 wherein said absorbing gas comprises air.

10. A photoacoustic speaker according to claim 1 wherein said absorbing gas comprises a gas having high absorption capability for said modulated laser beam.

11. A photoacoustic speaker according to claim 1 wherein said absorption chamber length is about one-half to three-quarters the distance required for substantially complete absorption of energy of said modulated laser beam.

12. A photoacoustic speaker according to claim 1 wherein the length of said elongated absorption chamber is more than five times greater than the diameter of said chamber.

13. A photoacoustic speaker according to claim 1 wherein said length of said elongated absorption chamber is about 10 to about 20 times greater than said diameter of said chamber.

14. A photoacoustic speaker according to claim 1 wherein said gas is maintained in said gas absorption chamber at a pressure of about 0.6 to about 1.4 atmospheres.

15. A photoacoustic speaker comprising: a laser beam source means, a modulating means capable of modulating the intensity of said laser beam in response to audio signal inputs producing a corresponding modulated laser beam, and an elongated sealed gas containment chamber serving as a gas absorption chamber in the path of said laser beam, said gas absorption chamber comprising a laser transparent window at one end which permits said laser beam to enter said gas absorption chamber, a rigid end at the opposite end fixed parallel to said window, and thin walls of a flexible material gastightly joined to said window and said rigid end, said gas absorption chamber confining gas capable of absorption of said modulated laser beam thereby producing pressure waves which impinge on said walls of said chamber to produce sound and transmit said sound exterior to said chamber.

16. A photoacoustic speaker according to claim 15 wherein said rigid end of said gas absorption chamber is coated with a laser reflective material.

17. A photoacoustic speaker according to claim 15 wherein said flexible material is selected from a group of membranes consisting of elastic latex and aluminum.

18. A method for producing photoacoustic sound comprising: producing a laser beam, modulating the intensity of said laser beam in proportion to audio signal inputs; passing the modulated laser beam through a laser transparent window in one end of an elongated sealed gas absorption chamber having thin flexible side walls and through the length of said elongated chamber to an opposite rigid end, said laser beam not striking said flexible side walls; absorbing radiation of said modulated laser beam by gas confined in said elongated chamber thereby producing photothermic pressure waves which produce sound and transmit said sound exterior of said chamber upon impingement on said side walls of said absorption chamber.

19. A method for producing photoacoustic sound comprising: producing a laser beam, and modulating the intensity of said laser beam in proportion to audio signal inputs; passing the modulated laser beam through a laser transparent window into an elongated sealed gas containment chamber serving as a gas absorption chamber having thin, flexible side walls and confining gas capable of absorption of said modulated laser beam, and passing a portion of said modulated laser beam to the opposite end of said absorption chamber, said modulated laser beam striking a laser reflective material reflecting said laser in reverse direction through said elongated chamber for further absorption, and thereby producing photothermic pressure waves which produce sound and transmit said sound exterior to said chamber upon impingement on said walls of said absorption chamber.

20. The method of claim 19 comprising the step of expanding laser beam prior to said modulating.

21. A method for producing photoacoustic sound comprising: producing a laser beam, and modulating the intensity of said laser beam in proportion to audio signal inputs; passing the modulated laser beam through a laser transparent window into an elongated sealed gas containment chamber serving as a gas absorption chamber having thin, flexible side walls and confining gas capable of absorption of said modulated laser beam, thereby producing photothermic pressure waves which produce sound and transmit said sound exterior to said chamber upon impingement on said walls of said absorption chamber to project a column of sound providing an acoustic dimension effect.

* * * * *